(12) United States Patent
Schmitt

(10) Patent No.: US 9,150,179 B2
(45) Date of Patent: Oct. 6, 2015

(54) DEFORMATION ELEMENT

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/278,059

(22) Filed: May 15, 2014

(65) Prior Publication Data

US 2014/0346812 A1 Nov. 27, 2014

(30) Foreign Application Priority Data

May 21, 2013 (DE) .................. 10 2013 105 155

(51) Int. Cl.
*B60R 21/04* (2006.01)
*F16F 7/12* (2006.01)
*B60R 21/34* (2011.01)

(52) U.S. Cl.
CPC . *B60R 21/04* (2013.01); *F16F 7/12* (2013.01); *B60R 2021/0435* (2013.01); *B60R 2021/343* (2013.01)

(58) Field of Classification Search
CPC ............ B60R 21/04; B60R 2021/0435; B60R 2021/343; B60R 21/02; F16F 7/12
USPC ....................................... 296/187.12
See application file for complete search history.

(56) References Cited

U.S. PATENT DOCUMENTS 6,488,312 B2 12/2002 Knoethig et al.
7,143,876 B2 * 12/2006 Tamada et al. ................ 188/371

FOREIGN PATENT DOCUMENTS

DE 199 58 299 6/2001

* cited by examiner

*Primary Examiner* — Pinel Romain
(74) *Attorney, Agent, or Firm* — Gerald E. Hespos; Michael J. Porco; Matthew T. Hespos

(57) ABSTRACT

The deformation element has a profile part and may be of U-shaped profile with legs in cross section or may be of single-shear configuration. The deformation element has at least one side wall formed in the manner of an accordion with z-shaped deformation folds. The predefined deformation folds are provided in a direction transverse to an acting force and are arranged opposed to one another.

13 Claims, 3 Drawing Sheets

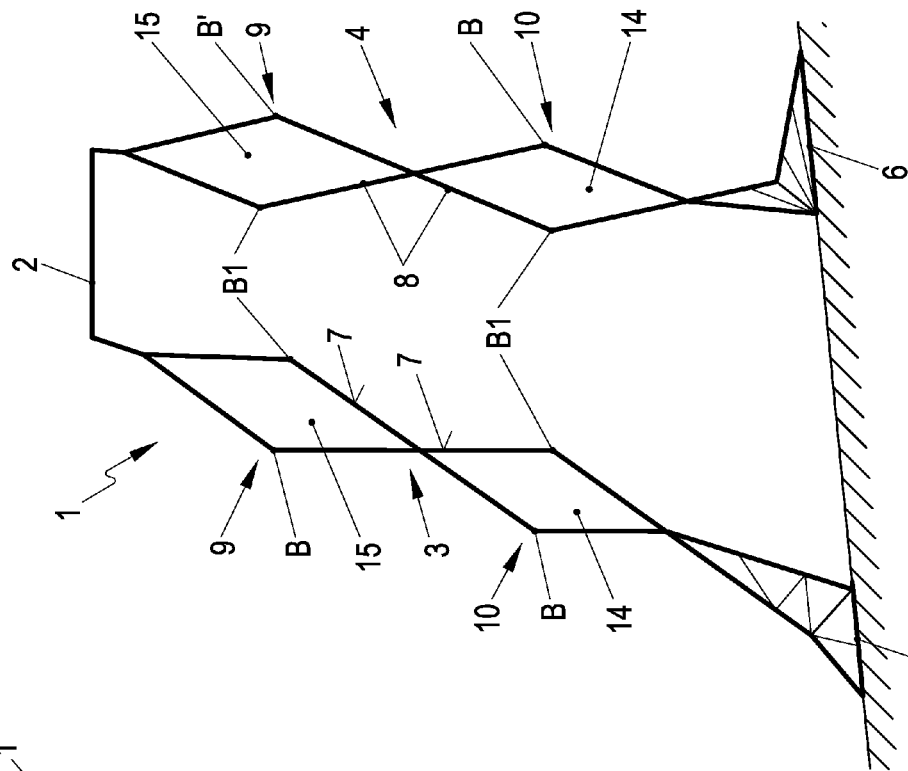
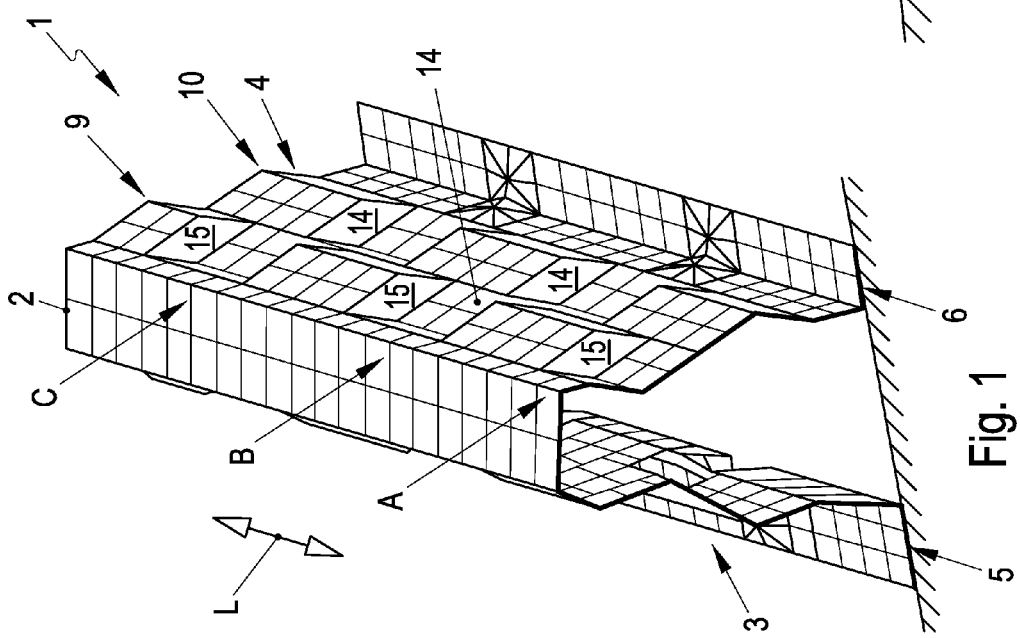

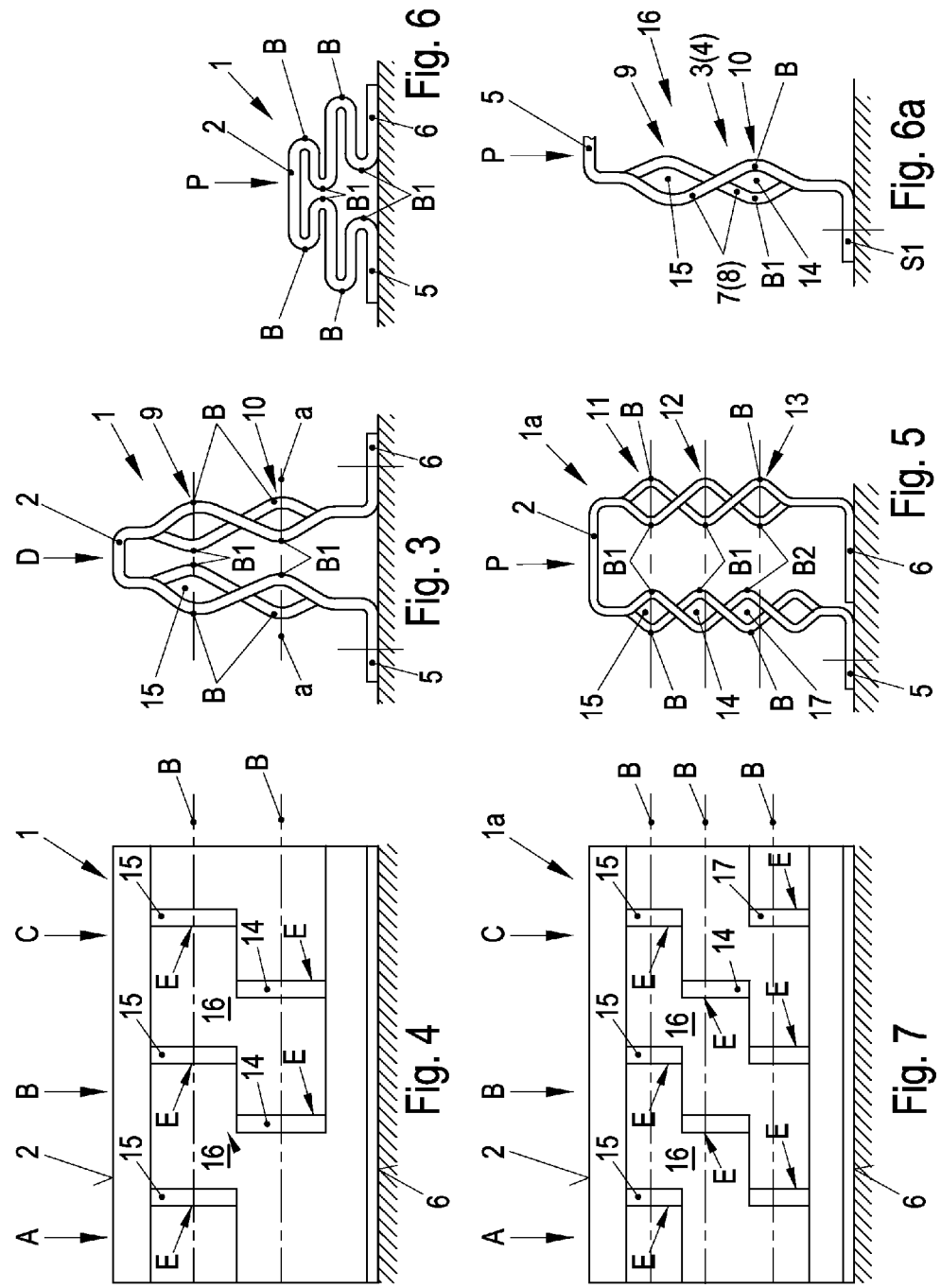

DEFORMATION ELEMENT

CROSS REFERENCE TO RELATED APPLICATION

This application claims priority under 35 USC 119 to German Patent Appl. No. 10 2013 105 155.3 filed on May 21, 2013, the entire disclosure of which is incorporated herein by reference.

BACKGROUND

1. Field of the Invention

The invention relates to a deformation element for a motor vehicle.

2. Description of the Related Art

DE 199 58 299 A1 discloses a deformation element for a motor vehicle. The deformation element has multiple deformable regions in the form of strips extending in undulating fashion over a longitudinal profile. The strips are offset with respect to one another in an alternating manner so that each wave peak is adjacent to a wave trough and vice versa, and passages or free spaces are formed between the mutually adjacent wave peaks.

It is an object of the invention to provide a deformation element as an impact protection means and for other purposes, in the interior or exterior region of a motor vehicle. The deformation element absorbs energy through deformation and can be produced and used in a simple manner.

SUMMARY OF THE INVENTION

The invention provides a two-stage, three-stage or further multi-stage deformation element that can absorb energy through deformation. More stages enable correspondingly greater energy absorption. In one embodiment, the deformation element comprises a profile part having, for example, a U-shaped profile in cross section, with deformable side legs that adjoin an upper transverse web and that have angled supports at a foot side. Each side leg comprises an accordion-like wall that is divided at least into multiple vertical sections that are juxtaposed in a longitudinal direction of the element and that are connected to one another in sections. The vertical sections of the side legs of the element are formed at least with two-stage or three-stage z-shaped deformation folds, and each of the opposite side legs of the element have identical deformation folds. The vertical sections with the z-shaped deformation folds are connected to one another in each case via a central planar wall section. This design of the deformation element enables the side walls to be folded together in the manner of an accordion in the event of a deformation. Thus, the side legs can fold together uniformly under the action of a force.

The accordion-like side legs of the deformation element preferably have the z-shaped configuration of the side legs with deformation folds of two-stage or three-stage form, wherein an adaptation of an absorption of energy during a deformation to the conditions in the vehicle and to the magnitude of the loads is made possible. The definition of the deformation element as two-stage or three-stage relates to the bending edges of the deformation folds in the vertical sections of the legs.

The vertical sections of the side legs with the z-shaped fold may be arranged so that oppositely angled bending edges of the z-shaped fold form lower and upper rhomboidal openings between adjacent vertical sections.

The profile part of the deformation element may have a U-shaped profile in cross section or a corresponding profile part. In a further embodiment, the profile part is a single-shear profile part where the upper and lower free ends have legs angled horizontally in opposite directions from the profile part to form a support.

The z-shaped folds in the juxtaposed sections of the side legs are arranged alternately rotated through 180 degrees. Thus, an inwardly directed bending edge of one section is directed toward an outwardly directed bending edge of the adjacent section and the rhomboidal openings are formed between the bending edges. The rhomboidal openings are visible when viewed in the longitudinal direction of the deformation element. The openings or free spaces between the individual vertical sections of the z-shaped folds permit a uniform, continuous folding-together action, with an absorption of energy, when a force acts on the deformation element.

The rhomboidal openings between the z-shaped folds of the individual vertical sections in the side legs may be of different sizes. For example, the upper openings close to the transverse web may be larger than the following lower openings between the z-shaped deformation folds, which are of two-stage or three-stage configuration, of the individual vertical sections. The sizes of the rhomboidal openings may continuously increase or decrease from the web to the supports so that the rhomboidal openings or free spaces are of different area sizes. Thus, it is possible to achieve a stepped characteristic curve for the absorption of energy during a deformation.

The deformation element may be produced, for example, by a cutting and bending process. Thus, vertical incisions can be formed in side legs in multiple vertical and horizontal planes. The vertical incisions are spaced apart from one another. Additionally, areas between the incisions, in each plane, are connected to one another via the central planar wall sections. As a result for a plate can be produced with the corresponding incisions and the U-shaped deformation element subsequently can be bent and the z-shaped folds subsequently can be achieved by a corresponding molding process. It is also conceivable for the plate to be provided with the z-shaped folds by stamping or the like, and for the U-shaped deformation element subsequently can be bent.

The profile part of the deformation element also may be produced from a semifinished part with the rhomboidal structure.

BRIEF DESCRIPTION OF THE DRAWINGS

FIG. 1 is a diagrammatic illustration of a deformation element.

FIG. 2 is an end view of the deformation element of FIG. 1.

FIG. 3 is a vertical section through a two-stage deformation element of FIG. 1.

FIG. 4 is a side view of a side leg of the two-stage deformation element with the rhomboidal openings between the z-shaped deformation folds.

FIG. 5 is an illustration of a deformation element in a further preferred (three-stage or four-stage) embodiment with a single-sided fastening at the bottom.

FIG. 6 is a vertical section through a two-stage deformation element in a deformed state, as in FIG. 3.

FIG. 6a shows a deformation element with a fastening leg which is angled at the upper free end and at the lower free end.

FIG. 7 shows a side view of a side leg of the three-stage deformation element with the rhomboidal openings between the z-shaped deformation folds of each section.

DETAILED DESCRIPTION OF THE PREFERRED EMBODIMENTS

Figure 8:
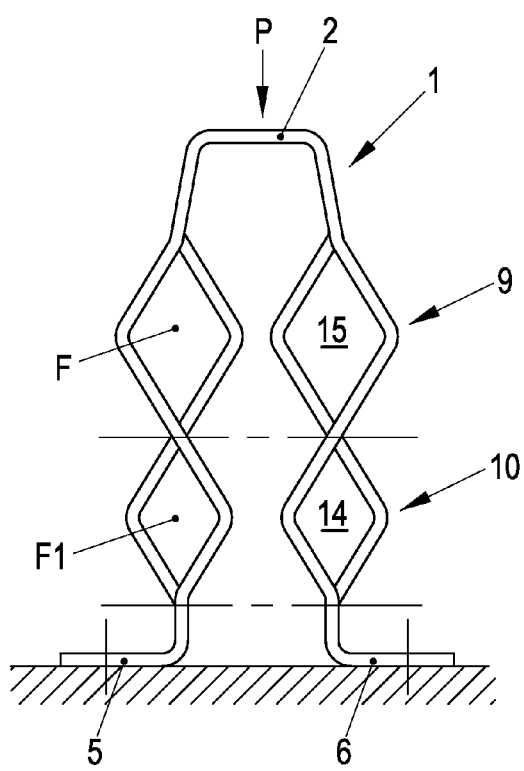
FIG. 8 shows a two-stage deformation element with different openings between the z-shaped deformation folds.

A deformation element 1; 1a; 1b for a motor vehicle is provided, for example, for impact protection or in the interior or exterior region, such as, for example, as a pedestrian protection means of a motor vehicle for absorbing energy in the event of a crash. The deformation element 1; 1a is a profile part with an upper transverse web 2 and adjoining, vertically oriented side legs 3 and 4 that have a foot side with angled supports 5, 6 that can be supported on the vehicle. The supports 5, 6 may lie one above the other (FIG. 5) or may be arranged oppositely to one another (FIG. 3). The deformation element 1, 1a may define a profile with a U-shaped cross section.

FIG. 6a shows a further advantageous embodiment of the invention where the deformation element 1b is formed, in single-shear configuration, as a vertically extending, single-wall web part with rhomboidal openings 14, 15, a horizontally angled leg S at the upper free end and a further horizontally angled leg S1 at the lower free end. The legs S and S1 are oriented oppositely with respect to one another.

The side legs 3, 4 are formed respectively with walls 7, 8 that are of accordion-like design. The side legs 3, 4, for example, are divided into multiple possible vertical sections A, B and C that are juxtaposed in a longitudinal direction L of the element 1; 1a; 1b and that are connected to one another in sections. The accordion-like design enables the side legs 3, 4 to be compressed with deforming action when subjected to a force in the direction P.

The vertical sections A, B, C of the side legs 3, 4 of the deformation element 1; 1a are implemented with two-stage or three-stage z-shaped deformation folds 9, 10 (FIG. 3) or 11, 12, 13 (FIG. 6).

The vertical sections A, B, C with the z-shaped deformation folds 9, 10; 11, 12, 13 are connected to one another in each case via a planar wall section 16 of the side legs 3, 4, as illustrated in more detail in FIGS. 1, 4 and 7.

The vertical sections A, B, C of the side legs 3, 4 with the z-shaped folds 9, 10; 11, 12, 13 are arranged such that, between adjacent vertical sections, in each case alternately between the z-shaped deformation folds 9, 10; 11, 12, 13, upper and lower rhomboidal openings 14, 15; 17 are formed by oppositely angled bending edges B, B1 of the individual z-shaped folds. The openings are visible when viewed in the longitudinal direction of the deformation element 1; 1a; 1b.

The z-shaped folds of the side legs 3, 4 in the two-stage and in the three-stage embodiment 9, 10 and 11, 12, 13 are in each case alternately arranged rotated through 180 degrees, wherein an inwardly directed bending edge B1; B2 of one section is directed toward an outwardly directed bending edge B of the adjacent section and the rhomboidal openings 14, 15; 17 are formed between said bending edges B and B1; B2.

Figure 8A:
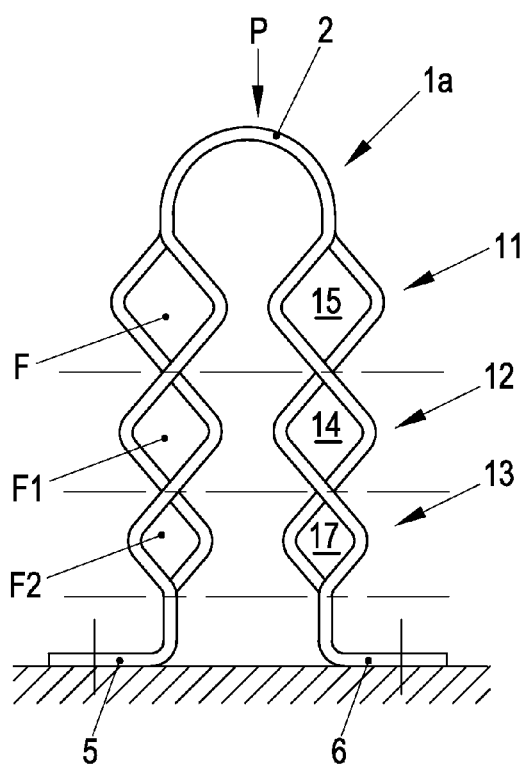
FIG. 8a shows a three-stage deformation element with openings of different sizes between the z-shaped deformation folds.

In a further embodiment of the invention, the rhomboidal openings between the z-shaped folds 9, 10; 11, 12, 13 of the individual vertical wall sections of the side legs 3, 4 may be of different sizes. This is illustrated in more detail in FIGS. 8 and 8a on the basis of the two-stage and three-stage embodiments of the deformation elements 1 and 1a. The upper rhomboidal openings 15 close to the transverse web 2 decrease in terms of size of the opening area toward the supports 5, 6 at the foot side, such that, in the embodiment of FIG. 8, there are two different sizes of opening areas F and F1; F2. In the embodiment of FIG. 8a, there are three different sizes of opening areas F, F1 and F2. The opening areas may continuously decrease or increase in size from top to bottom.

The deformation element 1; 1a with the two-stage and three-stage deformation fold 9, 10; 11, 12, 13 may be produced by a cutting and bending process. For this purpose, vertical incisions E; E1 as shown in FIGS. 4 and 7 are formed in the side legs 3, 4. For a two-stage and three-stage deformation fold 9, 10; 11, 12, 13, the incisions E are formed in two and three vertical planes, as illustrated in FIGS. 4 and 7. In the case of a deformation fold with four or more stages, it is self-evidently possible for further incisions to be provided in further planes. The incisions are arranged offset with respect to one another in a stepped manner in terms of height.

The deformation element 1; 1a; 1b also may be produced from a semifinished part with the rhomboidal structure.

After a molding process for establishing the two-stage and three-stage deformation folds 9, 10; 11, 12, 13, the bending edges B and B1; B2 lie one on top of the other in a horizontal plane a-a.

As a result of a force P acting on the deformation element 1; 1a; 1b, the z-shaped fold 9, 10; 11, 12, 13 is compressed with deforming action and the rhomboidal openings 14, 15, 17 are compressed such that the surfaces of the openings lie approximately one on top the other, as illustrated in more detail in FIG. 6 on the basis of the two-stage deformation element 1.

What is claimed is:

1. A deformation element for impact protection in a motor vehicle, the deformation element comprising: at least one deformable side wall with multiple juxtaposed deformable sections, the deformation element defining a profile part with at least one deformable side leg having first and second ends, a transverse web at the first end of the side leg and an angled support at the second end of the side leg, the side leg defining an accordion-like wall with z-shaped deformation folds divided at least into vertical sections that are juxtaposed in a longitudinal direction of the element and that are connected to one another in sections.

2. The deformation element of claim 1, wherein the vertical sections of the side leg of the element of the profile part are formed at least with two-stage or three-stage z-shaped deformation folds, and opposite side legs of the element each have identical deformation folds.

3. The deformation element of claim 1, wherein the vertical sections with the z-shaped deformation folds are connected to one another via a central planar wall section.

4. The deformation element of claim 1, wherein the profile part of the deformation element is formed, in single-shear configuration, as a vertically extending, single-walled web part with the rhomboidal openings, which web part, at the upper and lower free ends, comprises in each case one leg, angled horizontally in opposite directions from the profile part, as supports.

5. The deformation element of claim 1, wherein the at least one deformable side leg comprises two opposed deformable side legs, the transverse web connecting the first ends of the side legs to define a U-shaped profile.

6. The deformation element of claim 5, wherein the vertical sections of the side legs with the z-shaped folds are arranged so that rhomboidal openings are formed by oppositely angled bending edges of the z-shaped deformation folds.

7. The deformation element of claim 6, wherein the z-shaped deformation folds in juxtaposed sections of the side legs are in each case alternately arranged rotated through 180 degrees so that an inwardly directed bending edge of one section is situated opposite an outwardly directed bending edge of an adjacent section and the rhomboidal openings are formed between said bending edges.

8. The deformation element of claim 6, wherein the rhomboidal openings between the z-shaped deformation folds of the individual vertical sections in the side legs have different area sizes.

9. The deformation element of claim 7 wherein the rhomboidal openings close to the transverse web are larger than the rhomboidal openings farther from the transverse web.

10. The deformation element of claim 5, wherein the deformation element is produced by a forging and bending process, wherein vertical incisions can be formed in the side legs, the vertical incisions being laterally spaced apart and are offset with respect to one another in a stepped manner in terms of height.

11. The deformation element of claim 5, wherein the deformation element is made from a semi-finished part with the rhomboidal structure.

12. The deformation element of claim 5, wherein the bending edges of the z-shaped deformation folds, after a molding process, run in a horizontal plane centrally through the vertical incisions (E; EI) and form the rhomboidal openings.

13. The deformation element of claim 5, wherein, as a result of a force acting in a P direction on the web or on the leg of the deformation element, the z-shaped deformation folds are deformed so that the surfaces that form the rhomboidal openings lie approximately one on top of the other.

* * * * *